March 13, 1945.　　　A. P. COTTON　　　2,371,506
SIGNALING SYSTEM
Filed Feb. 14, 1944　　　2 Sheets-Sheet 1
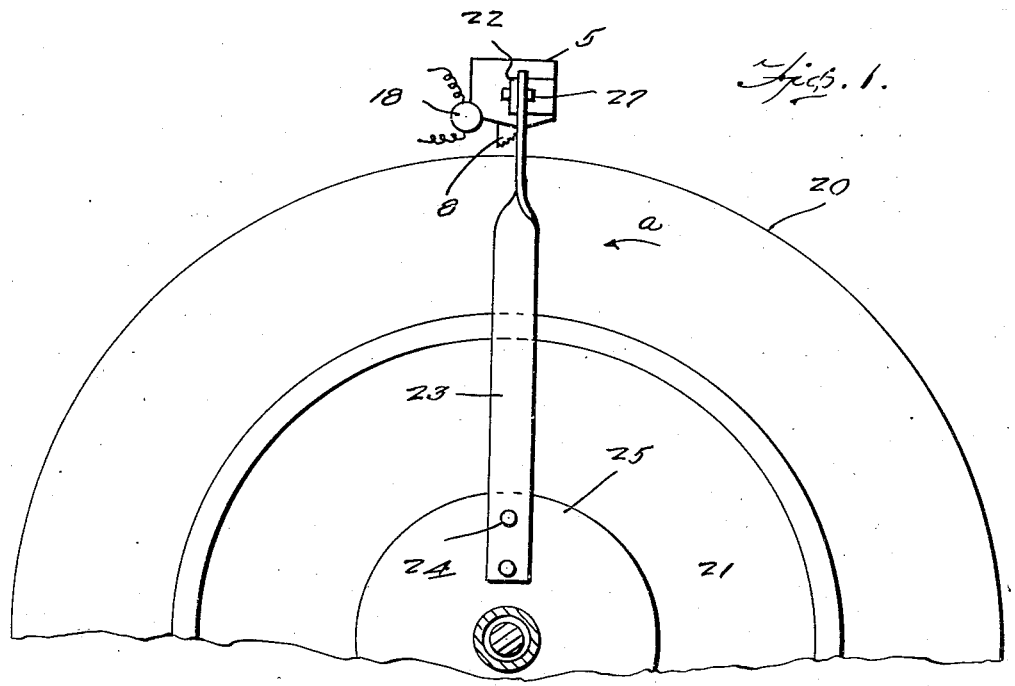
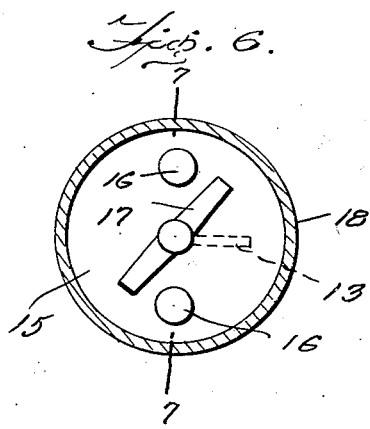
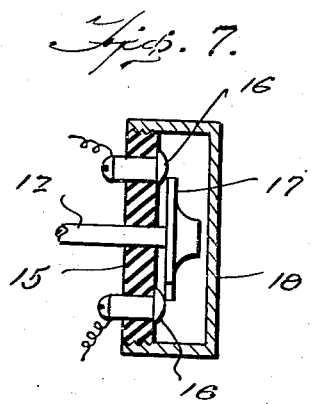
Inventor
Aubrey P. Cotton
By Clarence A. O'Brien
and Harvey B. Jacobson
Attorneys March 13, 1945.  A. P. COTTON  2,371,506
SIGNALING SYSTEM
Filed Feb. 14, 1944  2 Sheets-Sheet 2
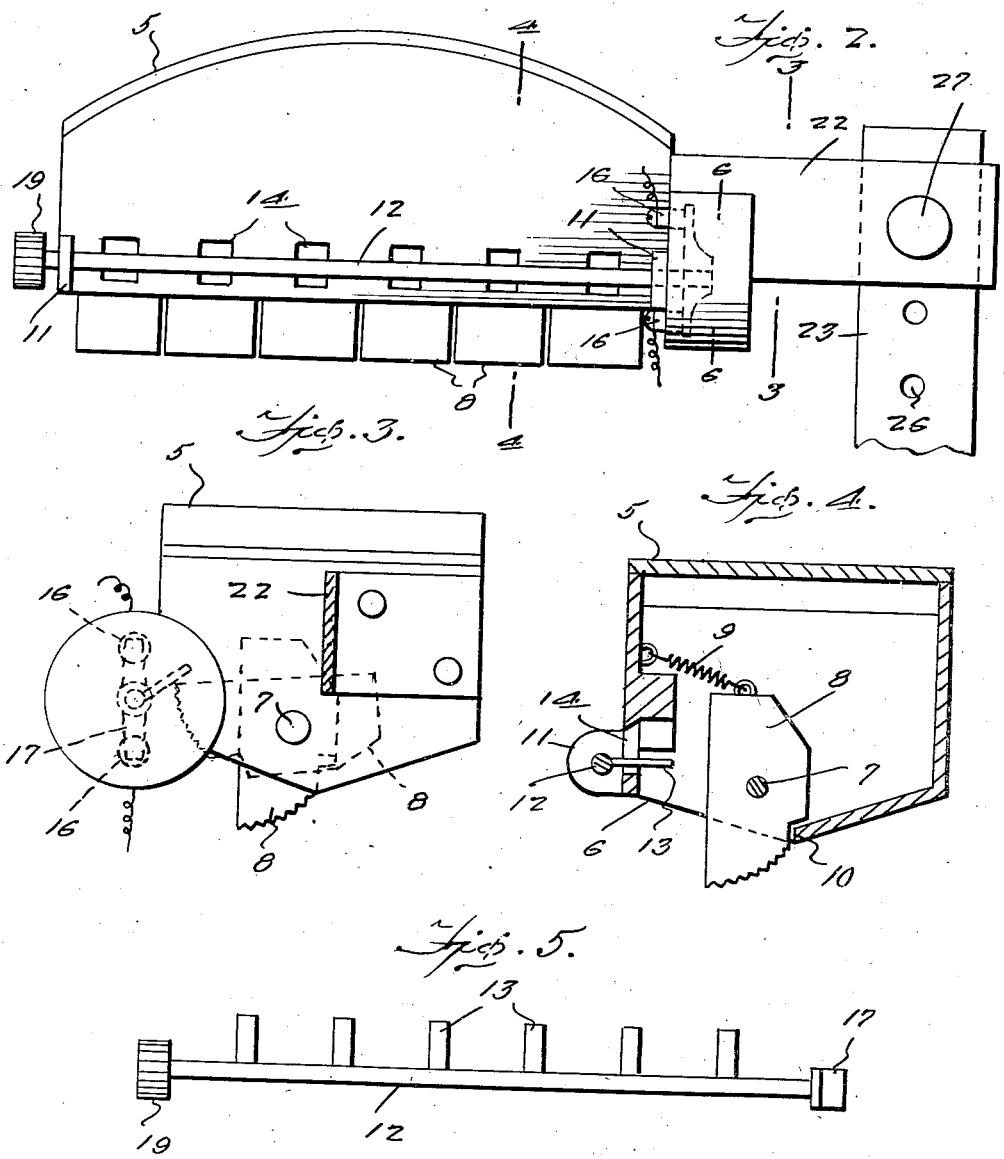
Inventor
Aubrey P. Cotton
By Clarence A. O'Brien
and Harvey B. Jacobson
Attorneys Patented Mar. 13, 1945

2,371,506

UNITED STATES PATENT OFFICE 2,371,506

SIGNALING SYSTEM

Aubrey P. Cotton, St. Matthews, S. C.

Application February 14, 1944, Serial No. 522,335

4 Claims. (Cl. 200—58)

This invention relates generally to signaling systems for motor vehicles equipped with pneumatic tires, and has more particular reference to an improved system of this kind wherein means is provided for promptly warning the driver of the vehicle when a nail or other object becomes initially partially embedded in the tread of the casing of any tire of the vehicle, so that the driver may promptly take steps to remove the nail or object and prevent puncture or serious damage to the tire by continuing to drive the vehicle with the nail or object in the tire.

Briefly described, the present invention contemplates the provision of a switch for controlling an electric signal circuit, and means mounted in proximity to the tread of a tire and operable by engagement therewith of a projecting nail or other object embedded in the tread of the tire for actuating said switch to close the signal circuit.

A specific object of the present invention is to provide a novel device of simple and practical construction embodying means operable by a projecting object embedded in the tire and means for operatively associating the circuit-controlling switch with said first-named means.

The present invention further contemplates the provision of a signal apparatus which is of generally simple, durable and compact form, and which may be readily applied for use and economically manufactured.

Other objects and features of the invention will become apparent from the following description when considered in connection with the accompanying drawings, and the invention consists in the novel form, combination and arrangement of parts hereinafter more fully described, shown in the accompanying drawings and claimed.

In the drawings, wherein like reference characters indicate corresponding parts throughout the several views:

Figure 1 is a fragmentary view partly in inside elevation and partly in section, showing the circuit-controlling device forming part of the present invention, operatively associated with a vehicle wheel.

Figure 2 is a fragmentary front elevational view of the circuit-closing device per se, as seen looking toward the right of Figure 1.

Figure 3 is a section taken on line 3—3 of Figure 2.

Figure 4 is a vertical section taken on line 4—4 of Figure 2.

Figure 5 is a plan view of the finger and movable switch contact-carrying shaft forming part of the device shown in Figure 2.

Figure 6 is a section through the switch taken on the plane of line 6—6 of Figure 2.

Figure 7 is a vertical section taken substantially on line 7—7 of Figure 6.

Referring in detail to the drawings, the present invention contemplates the provision of a signal circuit-controlling device associated with each wheel of the motor vehicle, and each of these devices preferably consists of an elongated casing 5 having a bottom opening, as at 6, and having a longitudinal horizontal shaft 7 extended therethrough and journaled in the ends thereof directly above the rear portion of the opening 6. Mounted upon the shaft 7 are a plurality of pivoted tumblers 8 which project downwardly through the opening 6 and are normally held in an upright position by means of tension springs 9. In this position, the lower ends of the tumblers 8 abut the bottom wall of the casing 5, as at 10, to limit swinging movement thereof to vertical or upright operative position. Projecting forwardly from the forward wall of casing 5 at the ends thereof are ears 11 in which is journaled a further horizontal shaft 12 having rearwardly projecting fingers 13 that extend rearwardly through openings 14 provided in the front wall of casing 5 coincident with the respective tumblers 8. Thus, a finger 13 is disposed in the path of each tumbler 8 so that when one of the latter is tilted against the action of spring 9 to the dotted line position of Figure 3, the associated finger 13 will be swung upwardly for rotating shaft 12 and causing closing of a switch to be presently described. The switch referred to preferably consists of an insulating plate 15 mounted on an end of casing 5 and carrying a pair of spaced fixed contacts 16 arranged to be simultaneously engaged or disengaged by a movable contact 17 of cross bar form fixed centrally upon the adjacent end of shaft 12. A cap 18 is provided over the contacts 16 and 17 and preferably detachably threaded onto the disc 15 for providing a waterproof casing for the switch contacts. The arrangement is such that when the shaft 12 is set to position the fingers 13 horizontally, as shown in Figure 4, the contact 17 is positioned, as shown in Figure 6, out of engagement with contacts 16 so as to open the signal circuit, and so that when the shaft 12 is rotated to the dotted line position of Figure 3 by swinging of a tumbler 8 to the dotted line position of Figure 3, the contact 17 bridges the contacts 16 and closes the signal circuit. A knob 19 is provided on the other end of shaft 12 so as to facilitate setting of the shaft normally in the position of Figure 4 with the signal circuit open. It will, of course, be understood that the shaft 12 has a frictional fit in the openings of ears 11 so that it will remain in any rotated position in which it is set until forcibly turned from that position. The device thus described is adapted to be mounted in a position above and in close proximity to the tread of the tire casing 20 of the automobile wheel 21 with which the device is associated, such mounting of the device being preferably effected by providing the casing 5 with a lateral supporting arm 22 on one end adjustably mounted on the upper end of a vertical supporting rod or post 23 whose lower end is fixed, as at 24, to the stationary member 25 provided at the inner side of the vehicle wheel. The member 25 may consist of the stationary brake drum associated with the wheel 21, and the upper end of the post 23 may have a series of openings 26 to facilitate bolting of the arm 22 thereto, as at 27, at different elevations. Thus, the device may be accommodated to wheels of different diameters with the lower ends of the tumblers 8 disposed in close proximity to the tire tread.

In use, one of the contacts 16 is connected with a terminal of a signal light 28 whose other terminal is connected with one side of a source of electricity, as shown in Figure 11. The other side of the source of electricity is preferably connected to one side of an audible signal device or buzzer 29 whose other terminal is connected with the other contact 16. It will thus be seen that when the contacts 16 are bridged by the movable contact arm 17, the signal light 28 will be lighted. As this is accomplished by movement of a tumbler 8 being caused by an object striking the same which is partially embedded in the tread of the tire 20, the driver of the vehicle will be promptly warned of the fact that such object is embedded in the tire and he may take prompt steps to remove the object to prevent further damage to or puncture of the tire.

In carrying the invention out, equipment above described will be associated with each wheel of the vehicle, and the switch of each equipment may control a separate signal light and buzzer.

In operation, the wheel 21 rotates in the direction of the arrow $a$ of Figure 1 when the vehicle is traveling ahead. Should an object become partially embedded in the tread of tire casing 20, it will engage one of the tumblers 8 and swing the same to the dotted line position of Figure 3 so as to move the adjacent finger 13 and rotate shaft 12 for closing the signal circuit by shifting the contact 17 on said shaft 12 into engagement with the contacts 16 associated therewith. In this way a signal lamp may be lighted to show the driver that an object has been partially embedded in the tread of a particular wheel tire of the vehicle. He may thus promptly bring the vehicle to a stop and remove the object from the tire, thereby avoiding puncture or further damage to the tire such as might result by continuing to drive the vehicle with the object embedded in the tire. It will thus be seen that the device has been designed in the interest of rubber conservation by making it possible to often prevent tires and tubes from being ruined beyond repair. It will also be noted that the device is simple in design and easy to construct and install. Minor changes in details of construction illustrated and described by way of example are contemplated, such as fairly fall within the spirit and scope of the invention as claimed.

What I claim as new is:

1. In a signal system of the character described, the combination of a vehicle wheel equipped with a pneumatic tire, a switch for controlling a signal circuit, and an actuating mechanism in coacting and operative relation with said switch, said actuating mechanism consisting of a support fixed to a stationary part of the vehicle, a shaft extending transversely of the tire and mounted on the support, actuating members carried by said shaft and located at adjacent points entirely across the tread of the tire, a second shaft mounted on the support and having fingers disposed in the path of movement of said actuating members, said switch including a movable contact carried by the last-named shaft and fixed contacts coacting with said movable contact and mounted on the support.

2. In a signal system of the character described, the combination of a vehicle equipped with a pneumatic tire, a switch for controlling a signal circuit, an actuating mechanism in coacting and operative relation with said switch, said actuating mechanism consisting of a support fixed to a stationary part of the vehicle, a casing carried by said support and extending transversely of the tread of the tire, said casing having an opening in the bottom thereof, a shaft extending longitudinally of and journaled in said casing, pivoted tumblers carried by said shaft and disposed with their lower ends projecting through the bottom opening of the casing in close proximity to the tread of the tire, a second shaft journaled on said casing parallel to the first-named shaft and having inwardly projecting fingers arranged in the path of movement of said tumblers, said switch including a casing mounted on the first-named casing and having fixed contacts therein, a movable contact cooperating with said fixed contacts and carried by the second-named shaft, said tumblers being movable forwardly by a projecting object partially embedded in the tire tread to engage and move said fingers for partially rotating the second-named shaft and engaging the movable contact with the fixed contacts of said switch.

3. In a signal system of the character described, the combination of a vehicle equipped with a pneumatic tire, a switch for controlling a signal circuit, an actuating mechanism in coacting and operative relation with said switch, said actuating mechanism consisting of a support fixed to a stationary part of the vehicle, a casing carried by said support and extending transversely of the tread of the tire, said casing having an opening in the bottom thereof, a shaft extending longitudinally of and journaled in said casing, pivoted tumblers carried by said shaft and disposed with their lower ends projecting through the bottom opening of the casing in close proximity to the tread of the tire, a second shaft journaled on said casing parallel to the first-named shaft and having inwardly projecting fingers arranged in the path of movement of said tumblers, said switch including a casing mounted on the first-named casing and having fixed contacts therein, a movable contact cooperating with said fixed contacts and carried by the second-named shaft, said tumblers being movable forwardly by a projecting object partially embedded in the tire tread to engage and move said fingers for partially rotating the second-named shaft and engaging the movable contact with the fixed contacts of said switch, said tumblers coacting with the first-named casing for limiting movement of the tumblers to a normal inoperative position, and yieldable means for retaining said tumblers in said normal inoperative position with respect to the fingers.

4. In a signal system of the character described, the combination of a vehicle wheel equipped with a pneumatic tire, a switch for controlling a signal circuit, and an actuating mechanism in coacting and operative relation with said switch, said actuating mechanism consisting of a vertical post fixed at its lower end to a stationary part of the vehicle, a casing mounted on and vertically adjustable relative to said post, said casing extending laterally from the post transversely across the tread of the tire, a shaft journaled in said casing longitudinally of the latter and transversely of the tire, pivoted tumblers mounted on said shaft and projecting through the bottom of said casing in proximity to the tire tread for being moved forwardly by a projecting object partially embedded in the tire tread, a second shaft journaled on said casing parallel to the first-named shaft and having fingers projecting rearwardly therefrom into the casing and in the path of the respective tumblers, said switch being mounted on said first-named casing and having a movable contact carried by the second-named shaft and movable to circuit-closing position upon upward displacement of said fingers by any one of said tumblers.

AUBREY P. COTTON.